A. L. STANFORD.
DRAFT GEAR.
APPLICATION FILED JUNE 11, 1909.

954,058.

Patented Apr. 5, 1910.

2 SHEETS—SHEET 1.

Witnesses:

Inventor:
Arthur L. Stanford
by Banning & Banning
Attys.

A. L. STANFORD.
DRAFT GEAR.
APPLICATION FILED JUNE 11, 1909.
954,058.
Patented Apr. 5, 1910.
2 SHEETS—SHEET 2.
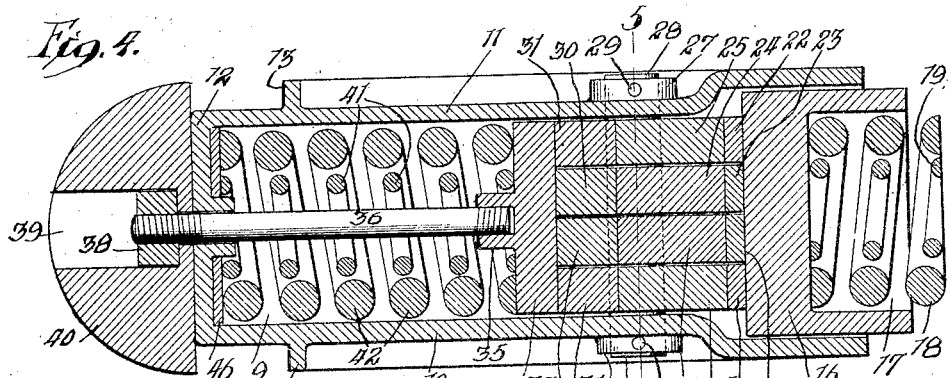
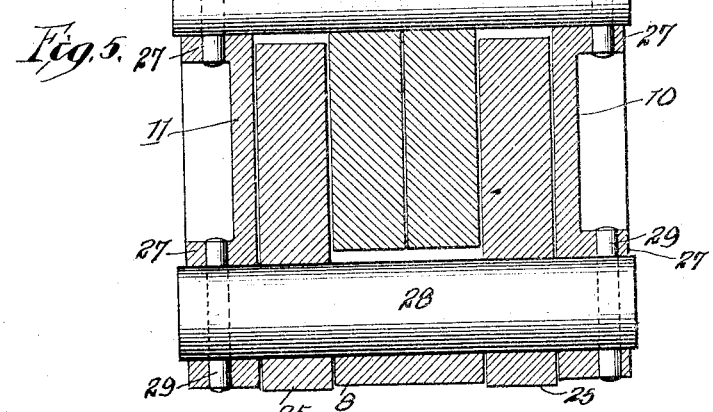
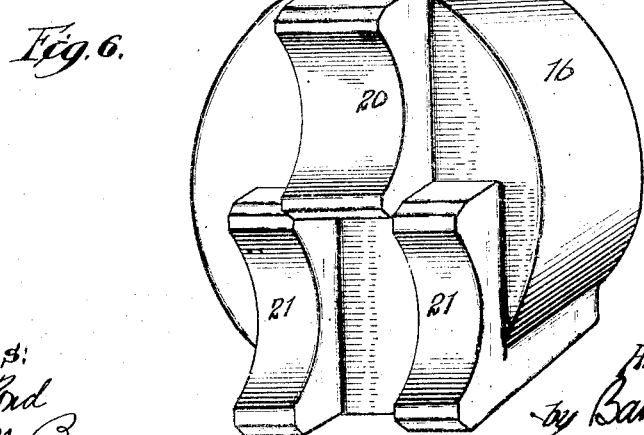
Witnesses:
Wm. P. Bond
Pierson W. Banning
Inventor:
Arthur L. Stanford
by Banning & Banning
Attys.

UNITED STATES PATENT OFFICE.

ARTHUR L. STANFORD, OF CHICAGO, ILLINOIS.

DRAFT-GEAR.

954,058.　　　　　Specification of Letters Patent.　　Patented Apr. 5, 1910.

Application filed June 11, 1909.　Serial No. 501,543.

*To all whom it may concern:*

Be it known that I, ARTHUR L. STANFORD, a citizen of the United States, residing at Chicago, in the county of Cook and State of Illinois, have invented certain new and useful Improvements in Draft-Gears, of which the following is a specification.

The draft gear of the present invention relates to certain features, of addition and improvement, on the devices described and claimed in my co-pending application, Serial No. 440,824, filed June 29, 1908.

The present invention, like that of the application referred to, is intended to act as a combined spring and friction draft gear; and the object of the present invention is to so construct and arrange the half circular friction blocks and coöperating friction arms that the desired frictional action and resulting curve of efficiency may be regulated with particular reference to the objects in view.

In my earlier application, the half round blocks, which acted on the forward side of the friction arms, were mounted to turn on coincident axes, so that the power is applied at substantially the center point of the casing in each instance. In the present case, the location and arrangement of the friction blocks has been changed so that the pressure against each of the friction arms will be applied from non-coincident points, up closer to the axes of the friction arms, so that a given degree of movement applied to the forward side of the friction arms will produce a proportionately increased degree of movement on the opposite side, with a consequent compression of the rear springs.

The invention further relates to the method of placing the rear springs under a normal spring compression sufficient to prevent any further compression of the rear springs and movement of the friction devices until the forward springs have been compressed to a given point and their efficiency fully exhausted.

Further objects will appear from a detailed description of the invention, which consists in the features of construction and combination of parts hereinafter described and claimed.

Figure 1:
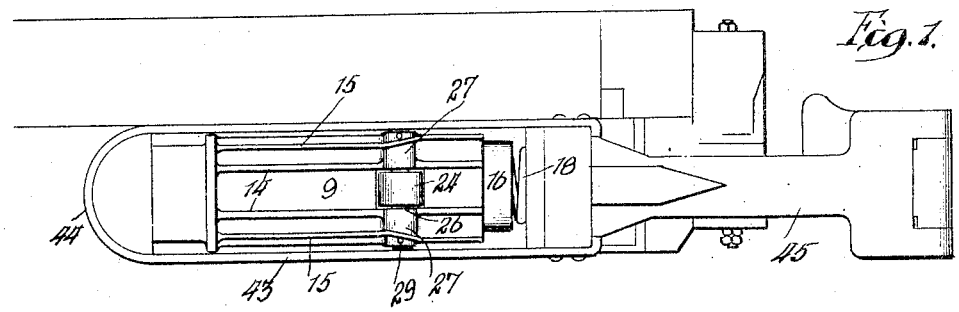
Figure 2:
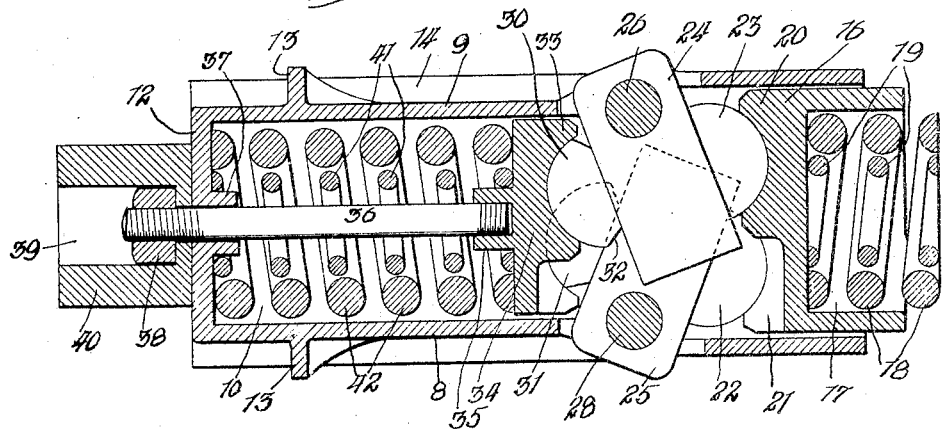
Figure 3:
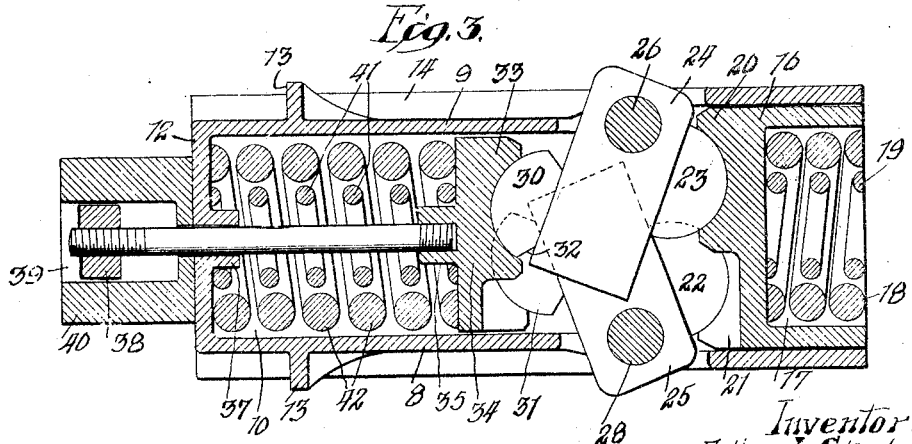

In the drawings, Figure 1 is a side elevation of the draft gearing of the present invention, as applied to a drawbar and coupling head of standard construction; Fig. 2, a sectional plan view of the gearing taken through the center thereof and showing the gearing in uncompressed condition; Fig. 3, a similar view showing the gearing subjected to a maximum compression; Fig. 4, a longitudinal sectional elevation taken through the center of the gearing; Fig. 5, a cross sectional view taken on line 5—5 of Fig. 4; and Fig. 6, a perspective view of the forward frictional socket member.

The gearing comprises a substantially rectangular casing having side walls 8 and 9, a floor 10, and a top or roof 11. The casing is further provided at the rear end with a wall 12, and the side walls, a short distance forward of the rear walls, are furnished with outwardly projecting reinforced shoulders 13, which are preferably positioned as indicated, to accommodate the casing of the gearing to the space allotted therefor under the M. C. B. requirements. The side walls, furthermore, are reinforced by longitudinally extending inner ribs 14 and outer ribs 15, and the forward ends of the side walls are slightly offset as compared with the rear portions of the side walls, in order to afford an increased inner dimension at the forward ends of the casing.

Within the forward or enlarged end of the casing is located a forward frictional socket member 16, which is hollowed out at its forward end to afford a cylindrical spring chamber 17, which receives the outer and inner coil springs 18 and 19 respectively, the forward ends of which springs when uncompressed project a substantial distance beyond the recessed end of the socket member, the function of these springs being to compensate for slight shocks or jars without subjecting the rear springs to compression until the forward springs have been compressed to the extent necessary to force them back flush with the forward end of the forward socket member. The forward socket member is best illustrated in Fig. 6, from which it will be seen that its inner face is provided on one side with a centrally disposed lug 20, which coöperates with a pair of laterally disposed lugs 21, one on each side of the inner end of the center lug 20. The laterally disposed lugs 21 are of less width than the center lug, the intention being that the center lug will present a frictional surface substantially equal to that of the combined frictional surfaces afforded by the laterally disposed lugs.

Each of the lugs is recessed on its inner or acting face, the recess being curved on the arc of a circle from end to end of the lug. The lugs above described coöperate with two outer friction blocks 22 and intermediate friction blocks 23, the intermediate blocks finding a bearing within the center lug 20, and the outer blocks finding a bearing within the laterally disposed lugs 21. Each of the blocks is of half cylindrical shape and the socket recesses in the lugs are so formed that the friction blocks will have little or no overlap, but will each exert its pressure at a point close to the adjacent side of the casing, so that the pressure applied to the blocks will be transmitted along non-coincident lines. The four forward friction blocks coöperate with intermediate friction arms 24 and a pair of outer friction arms 25, which latter underlie and overlie the intermediate arms and are adapted to swing in horizontal planes, coincident with the planes of movement of the friction blocks. The intermediate friction arms are hinged to a vertically extending, heavy bearing pin 26, the upper and lower ends of which are socketed within recessed bosses 27, which protrude from the side walls of the casing, as best shown in Fig. 1, and the outer friction arms, which are located above and below the intermediate arms, are similarly hinged to a heavy bearing pin 28, which is similarly socketed, the pins in each instance being held in place by means of a key or spline 29, which is entered through the wall of the protuberant socket boss.

The intermediate and outer friction arms coöperate with intermediate and outer rear friction blocks 30 and 31 respectively, which are in shape similar to the forward friction blocks, save that the corners 32 are cut or beveled away for a purpose to be hereinafter explained. The rear friction blocks find independent bearings in recessed bosses 33, similar to those previously described, which bosses are formed on the forward or inner face of a rear socket block 34, which occupies the space within the casing to the rear of the friction arms. The sockets for the rear friction blocks are preferably so formed as to permit the rear friction blocks to turn more nearly in axial alinement with one another, and in some cases it may be desirable to so form the recesses that the axes of the rear blocks will be coincident with one another, depending upon the results sought to be obtained and the curvature of efficiency desired. The rear socket block is provided on its rear or outer face with a boss 35, into which is screwthreaded the forward end of an adjusting rod 36, the rear end of which freely passes through a boss 37, in the center of the rear wall of the casing, and the end of the rod has screwthreaded thereon an adjusting nut 38, which is entered within a socket recess 39 formed in the outer face of a half cylindrical filler block 40. The threads at opposite ends of the adjusting rod are of the right and left variety, so that by turning the nut, the socket block 34 can be retracted against the tension of inner and outer interposed coil springs 41 and 42 respectively.

The casing of the draft gearing is embraced on the top and bottom by the arms of a yoke 43, the head 44 of which is rounded to register with the rounded surface of the filler block 40. The yoke is attached in the usual manner to a drawbar 45 of standard type.

In use, it is desirable to initially adjust the rear socket block 34, by the action of the rod 36 to the proper degree, to subject the rear springs to a relatively severe, normal pressure. This normal pressure should be such that, in combination with the pressure required to initially impart a movement to the friction members, it will be substantially equal to the pressure necessary to compress the forward springs to their limit of movement. By adjusting the parts in this manner, slight shocks or jars will be entirely compensated for by the action of the forward springs before the rear springs are further compressed, and the friction devices will thereby be relieved from any wear during the ordinary or usual operation of the draft gearing. After the forward springs have been compressed to such an extent as to be completely housed within the recess 17, pressure will be brought to bear against the forward end of the forward socket member and the pressure so applied will cause such member to travel toward the center, the limit of which movement will be reached when the forward end of the forward socket member is brought flush or in line with the forward end of the casing, which is the position indicated in Fig. 3, and which marks the limit of efficiency of the draft gearing. As the forward socket member is moved to the rear, the forward friction blocks will begin to turn in their bearings and to exert a pressure against the forward edges of the friction arms, which, as the arms are swung, will slide across the flat inner faces of the forward friction blocks, thereby setting up a heavy frictional action, for which the gearing is particularly designed.

It will be noted that the pressure against the swinging friction arms will be applied in each case at a point relatively near the axis of movement of the respective arms and that the pressure will be imparted from the opposite side of the arms to the rear friction blocks at a point in each case relatively distant from the axis of movement of the respective arms, so that a relatively short, longitudinal movement of the forward friction blocks will impart a relatively long, longitudinal movement to the rear friction blocks with a proportionately great compression of the rear springs. Furthermore, by beveling off the corners 32 of the friction blocks, the forward straight edges of the blocks will be shortened, so that the application of the pressure exerted by the swinging friction arms will in each case be brought more closely to the center axis of the respective blocks, whereby a correspondingly greater pressure will be required to turn or tilt the blocks in their respective sockets than if the forward straight edges were extended. As the parts are moved under pressure, friction will be generated between the curved faces of the forward and rear friction blocks and the sockets within which they turn, between the straight inner faces of the friction blocks and the edges of the arms along which they travel, and between the arms themselves and the pins on which they are hinged. The frictional movements between the arms, the blocks, and the socket members will subject the casing to pressure directed in longitudinal lines, and the frictional action exerted between the arms and the pins will subject the casing to pressure exerted in substantially transverse lines and imparted to the side walls of the casing, so that, as a result, the strain will be divided and distributed as regards the casing.

By changing the locations of the forward and rear friction blocks with respect to one another, the resultant compression of the rear springs incident to a given amount of movement applied to the forward socket member can be regulated to any desired degree, which is highly important in the art to which the present invention relates. Furthermore, the arrangement of the parts is such that there will be no cramping or wedging movements which tend to lock the frictional members together when subjected to the great pressures incidental to actual usage, so that the compression and release of the gearing will be smooth and uniform.

I claim:

1. In a draft gearing, the combination of a casing, two friction arms pivoted to opposite sides of the casing and adapted to swing in the arcs of their respective circles, a socket member, and two friction blocks mounted to turn on different axes within the socket member and held in frictional contact with the pivoted arms, substantially as described.

2. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, and a pair of rear friction blocks mounted to turn within the rear socket member and held in frictional contact with the pivoted arms, substantially as described.

3. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, and a pair of rear friction blocks mounted to turn on different axes within the rear socket member and held in frictional contact with the pivoted arms, substantially as described.

4. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, a pair of rear friction blocks mounted to turn within the rear socket member and held in frictional contact with the pivoted arms, a forward spring bearing against the forward socket member and normally projecting outwardly therefrom and adapted to compensate slight shocks or jars, and a rear spring bearing against the rear socket member and normally held under sufficient compression to permit the maximum compression of the forward spring prior to the further compression of the rear spring, substantially as described.

5. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, a pair of rear friction blocks mounted to turn on different axes within the rear socket member and held in frictional contact with the pivoted arms, a forward spring bearing against the forward socket member and normally projecting outwardly therefrom and adapted to compensate slight shocks or jars, and a rear spring bearing against the rear socket member and normally held under sufficient compression to permit the maximum compression of the forward spring prior to the further compression of the rear spring, substantially as described.

6. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, a pair of rear friction blocks mounted to turn within the rear socket member and held in frictional contact with the pivoted arms, a forward spring bearing against the forward socket member and normally projecting outwardly therefrom and adapted to compensate slight shocks or jars, a rear spring bearing against the rear socket member and normally held under sufficient compression to permit the maximum compression of the forward spring prior to the further compression of the rear spring, and a screw adjusting rod engaging the rear socket member and entered through the rear end wall of the casing and adapted to be adjusted to regulate the normal compression of the rear spring, substantially as described.

7. In a draft gearing, the combination of a casing, two friction arms pivoted to opposite sides of the casing and adapted to swing in the arcs of their respective circles, a forward socket member and a rear socket member, a pair of forward friction blocks mounted to turn on different axes within the forward socket member and held in frictional contact with the pivoted arms, a pair of rear friction blocks mounted to turn on different axes within the rear socket member and held in frictional contact with the pivoted arms, a forward spring bearing against the forward socket member and normally projecting outwardly therefrom and adapted to compensate slight shocks or jars, a rear spring bearing against the rear socket member and normally held under sufficient compression to permit the maximum compression of the forward spring prior to the further compression of the rear spring, and a screw adjusting rod engaging the rear socket member and entered through the rear end wall of the casing and adapted to be adjusted to regulate the normal compression of the rear spring, substantially as described.

8. In a draft gearing, the combination of a forward spring mounted to compensate slight shocks or jars, a rear spring, and means, independent of the forward spring, for normally holding the rear spring under sufficient compression to permit of a given degree of compression of the forward spring prior to the further compression of the rear spring, substantially as described.

9. In a draft gearing, the combination of a casing, a pair of oppositely disposed friction arms pivoted to opposite sides of the casing and adapted to swing one under the other, a pair of forward friction blocks, each of half cylindrical formation and having flat inner faces bearing against the forward sides of the respective arms, a socket member within which the forward friction blocks are mounted to turn on different axes at opposite sides of the center line between the friction arms, a pair of rear friction blocks of semi-cylindrical formation, and a rear socket member within which the rear friction blocks are mounted, substantially as described.

10. In a draft gearing, the combination of a casing, a pair of oppositely disposed friction arms pivoted to opposite sides of the casing and adapted to swing one under the other, a pair of forward friction blocks, each of half cylindrical formation and having flat inner faces bearing against the forward sides of the respective arms, a socket member within which the forward friction blocks are mounted to turn on different axes at opposite sides of the center line between the friction arms, a pair of rear friction blocks of semi-cylindrical formation, having their ends cut away to reduce the contact surface with the rear sides of the respective friction arms, and a rear socket member within which the rear friction blocks are mounted, substantially as described.

11. In a draft gearing, the combination of a casing, a pair of oppositely disposed friction arms pivoted to opposite sides of the casing and adapted to swing one under the other, a pair of forward friction blocks, each of semi-cylindrical formation and having flat inner faces bearing against the forward sides of the respective arms, a socket member within which the forward friction blocks are mounted to turn on different axes at opposite sides of the center line between the friction arms, a pair of rear friction blocks of semi-cylindrical formation, and a rear socket member within which the rear friction blocks are mounted in position to turn on axes on opposite sides of the center line between the friction arms, substantially as described.

12. In a draft gearing, the combination of a casing, a pair of oppositely disposed friction arms pivoted to opposite sides of the casing and adapted to swing one under the other, a pair of forward friction blocks, each of semi-cylindrical formation and having flat inner faces bearing against the forward sides of the respective arms, a socket member within which the forward friction blocks are mounted to turn on different axes at opposite sides of the center line between the friction arms, a pair of rear friction blocks of semi-cylindrical formation, having their ends cut away to reduce the contact surface with the rear sides of the respective friction arms, and a rear socket member within which the rear friction blocks are mounted in position to turn on axes on opposite sides of the center line between the friction arms, substantially as described.

13. In a draft gearing, the combination of a friction arm pivoted to swing in the arc of a circle, a friction block having a rounded outer face and a straight inner face, having its ends cut away to reduce the contact surface with the friction arm, and a socket member within which the rounded outer face of the friction block is adapted to turn, substantially as described.

ARTHUR L. STANFORD.

Witnesses:
 PIERSON W. BANNING,
 SAMUEL W. BANNING.